United States Patent
Grishaw (10) Patent No.: US 8,281,049 B2
(45) Date of Patent: Oct. 2, 2012

(54) HOST-DAUGHTERCARD CONFIGURATION WITH DOUBLE DATA RATE BUS

(75) Inventor: James Everett Grishaw, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 12/339,732

(22) Filed: Dec. 19, 2008

(65) Prior Publication Data
US 2010/0161851 A1    Jun. 24, 2010

(51) Int. Cl.
*G06F 3/00* (2006.01)
(52) U.S. Cl. .......... 710/29; 710/19; 710/30; 710/52; 710/57; 709/213; 709/217; 709/232; 709/235; 370/229; 370/230; 370/235
(58) Field of Classification Search .............. None
See application file for complete search history.

(56) References Cited

U.S. PATENT DOCUMENTS

| | | | |
|---|---|---|---|
| 5,249,280 A | 9/1993 | Nash et al. | 711/5 |
| 5,675,807 A | 10/1997 | Iswandhi et al. | 710/260 |
| 5,784,390 A * | 7/1998 | Masiewicz et al. | 714/763 |
| 5,805,833 A | 9/1998 | Verdun | 710/303 |
| 5,978,866 A * | 11/1999 | Nain | 710/22 |
| 6,192,492 B1 * | 2/2001 | Masiewicz et al. | 714/56 |
| 6,549,960 B1 * | 4/2003 | Allison et al. | 710/29 |
| 6,598,109 B1 | 7/2003 | McAlister et al. | 710/306 |
| 6,772,249 B1 | 8/2004 | Lada et al. | 710/100 |
| 6,871,237 B2 * | 3/2005 | Han et al. | 710/5 |
| 6,883,171 B1 | 4/2005 | Bittner et al. | 718/108 |
| 6,904,506 B2 | 6/2005 | Wu et al. | 711/170 |
| 6,990,549 B2 | 1/2006 | Main et al. | 710/306 |
| 7,181,551 B2 * | 2/2007 | Grishaw et al. | 710/11 |
| 7,401,126 B2 * | 7/2008 | Pekkala et al. | 709/217 |
| 7,457,845 B2 * | 11/2008 | Fan et al. | 709/213 |
| 7,617,291 B2 * | 11/2009 | Fan et al. | 709/213 |
| 7,688,838 B1 * | 3/2010 | Aloni et al. | 370/412 |
| 7,733,770 B2 * | 6/2010 | McAlpine et al. | 370/229 |
| 7,953,817 B2 * | 5/2011 | Fan et al. | 709/213 |
| 2002/0172195 A1 * | 11/2002 | Pekkala et al. | 370/360 |
| 2002/0181395 A1 * | 12/2002 | Foster et al. | 370/229 |
| 2004/0230717 A1 * | 11/2004 | Funatsu et al. | 710/22 |
| 2005/0076228 A1 * | 4/2005 | Davis et al. | 713/188 |

(Continued)

OTHER PUBLICATIONS

'Design and Implementation of a Fault Tolerant ATM Switch' by Kuochen Wang and Feng-Ming Lin, Journal of Information Science and Engineering, 1999.*

(Continued)

*Primary Examiner* — Steven Snyder
(74) *Attorney, Agent, or Firm* — Brinks, Hofer, Gilson & Lione (57) ABSTRACT

A double data rate bus system includes a host-network interface card configuration wherein the host is configured to recognize the network interface card to establish a double data rate bus between the host and the network interface card. The host is configured to generate a plurality of generic data frame queues. Each of the generic data frame queues is configured to receive and to transmit generic data frames via the double data rate bus. The network interface card is configured to transmit a plurality of dynamic memory access read requests to the host via the double data rate bus. The host is configured to allow each of the plurality of dynamic memory access read requests to remain pending prior to responding to any one of the plurality of dynamic memory access read requests.

23 Claims, 6 Drawing Sheets

U.S. PATENT DOCUMENTS

| | | | |
|---|---|---|---|
| 2005/0086409 A1* | 4/2005 | Grishaw et al. | 710/301 |
| 2005/0165980 A1* | 7/2005 | Clayton et al. | 710/22 |
| 2005/0177657 A1* | 8/2005 | Pope et al. | 710/36 |
| 2005/0213603 A1* | 9/2005 | Karighattam et al. | 370/463 |
| 2005/0289252 A1* | 12/2005 | Kim et al. | 710/19 |
| 2006/0104298 A1* | 5/2006 | McAlpine et al. | 370/412 |
| 2007/0183418 A1* | 8/2007 | Riddoch et al. | 370/389 |
| 2007/0268830 A1* | 11/2007 | Li et al. | 370/235 |
| 2010/0020818 A1* | 1/2010 | Cardona et al. | 370/463 |

OTHER PUBLICATIONS

'Dynamic Quality of Service on IP Networks' by Tippyarat Tansupasiri and Kanchana Kanchanasut, ICOIN 2003.*

'Preliminary Evaluations of a FPGA-based-Prototype of DIM-Mnet-2 Network Interface' by Noboru Tanabe et al., 2005 IEEE.*

HyperTransport, Wikipedia, available at http://en.wikipedia.org/wiki/HyperTransport on Dec. 18, 2008, 5 pgs.

HyperTransport I/O Link Specification, HyperTransport Technology Consortium, Jul. 23, 2008, available at http://www.hypertransport.org/docucontrol/HTC20051222-00046-0028.pdf on Dec. 18, 2008, pp. 1, 15-30, 42, 52, and 53, 20 pgs.

Data Center Ethernet, Wikipedia, available at http://en.wikipedia.org/wiki/Data_Center_Ethernet on Dec. 18, 2008, 3 pgs.

Fabric Convergence from a Storage Perspective, Ko et al., May 29, 2007, available at www.ieee802.org/1/files/public/docs2007/au-ko-fabric-convergence-0507.pdf on Dec. 18, 2008, 15 pgs.

Ethernet Flow Control, Wikipedia, available at http://en.wikipedia.org/wiki/Data_Center_Ethernet on Dec. 18, 2008, 2 pgs.

IEEE 802.1p, Wikipedia, available at www.ieee802.org/1/files/public/docs2007/au-ko-fabric-convergence-0507.pdf on Dec. 18, 2008, 1 pg.

Freescale and Kaspersky, Accelerated Antivirus Solution Platform for OEM Vendors, available at http://www.freescale.com/files/32bit/doc/white paper/KASPERSKYWP.pdf on Dec. 18, 2008, 14 pgs., last modified Jun. 15, 2007.

PCI Express Base Specification, Mar. 28, 2005, 508 pgs.

CISCO Systems, *CISCO 1700 Series Modular Access Routers*, Data Sheet, copyright 1992-2004 Cisco Systems, Inc. San Jose, California, downloaded from the Internet: <http://wwwin.cisco.com/cmc/cc/pd/rt/1700/index.thm>.

CISCO Systems, *G.shdsl WAN Interface Card for the Cisco 1700 Series*, Data Sheet, copyright 1992-2001 Cisco Systems, Inc., San Jose, California, downloaded from the Internet: <http://wwwin.cisco.com/cmc/cc/pd/rt/1700/prodlit/wic17_ds.htm>.

CISCO Systems, *Overview of Cisco Interface Cards*, Cisco Interface Cards Installation Guide, Chapter 1, Cisco Systems, Inc., San Jose, California, downloaded from the Internet: <http://wwwin.cisco.com/cmc/cc/pd/1700/prolit/ads17_ga.htm>.

* cited by examiner

| COMMAND OPCODE | GDF QUEUE | DATA | Rx FLAGS | CRC8 |
|---|---|---|---|---|
| 0X12 | 8 BITS | N BYTES | 8 BITS | 8 BITS |

HOST-DAUGHTERCARD CONFIGURATION WITH DOUBLE DATA RATE BUS

FIELD OF THE INVENTION

The present disclosure relates generally to network interface cards.

BACKGROUND

Host platforms may communicate with corresponding networks through network interface cards. The network interface cards may be implemented as peripheral devices such as daughtercards. The daughtercards may manage data flowing to and from the host platform. The host platform and daughtercard may communicate with one another to indicate current conditions pertaining to the network and the host platform. The network and host platform may utilize the daughtercard to perform data transactions with one another.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

According to one aspect of the disclosure, a double data rate bus system may include a host-network interface card configuration where the host is configured to recognize the network interface card to establish a double data rate bus between the host and the network interface card. The host may be configured to generate a plurality of generic data frame queues. Each of the generic data frame queues is configured to receive and to transmit generic data frames via the double data rate bus.

According to another aspect of the disclosure, the network interface card may be configured to transmit a plurality of dynamic memory access read requests to the host via the double data rate bus, and where the host is configured to allow each of the plurality of dynamic memory access read requests to remain pending prior to responding to any one of the plurality of dynamic memory access read requests.

According to another aspect of the disclosure, a method of operating a double data rate bus system may include passing a first generic data frame via a double data rate bus. The first generic data frame may correspond to a first generic data frame queue. The method may further include suspending the passing of the first generic data frame based on a first predetermined condition. The method may further include passing a second generic data frame via the double data rate bus upon suspension of the passing of the first generic data frame. The second generic data frame may correspond to a second generic data frame queue. The method may further include resuming the passing of the first generic data frame via the double data rate bus upon completion of transmission of the second generic data frame.

According to another aspect of the disclosure, a computer-readable medium encoded with computer executable instructions that are executable with a processor. The computer-readable medium may comprise instructions executable to pass a first generic data frame via a double data rate bus. The first generic data frame may correspond to a first generic data frame queue. The computer readable medium may further include instructions executable to suspend the passing of the first generic data frame based on a first condition. The computer readable medium may further include instructions to transmit a second generic data frame via the double data rate bus upon suspension of passing the first generic data frame. The second generic data frame may correspond to a second generic data frame queue. The computer readable medium may further include instructions to resume passing the first generic data frame via the double data rate bus upon completion of transmission of the second generic data frame.

Example Embodiments

In one example, a host-network interface card arrangement may be used to communicate with a network, such as a wide area network. The host may communicate with a network through a network interface card. The network interface card and host may communicate with one another over a double data rate bus. In one example, multiple generic data frame queues may be established in a host allowing generic data frames to be transmitted and received by the generic data frame queues via the double data rate bus. In another example, the host may receive a plurality of dynamic memory access read requests from the network interface card via the double data rate bus. The received plurality of dynamic memory access read requests may remain outstanding prior to the host responding to any of the outstanding dynamic memory access read requests.

Figure 1:
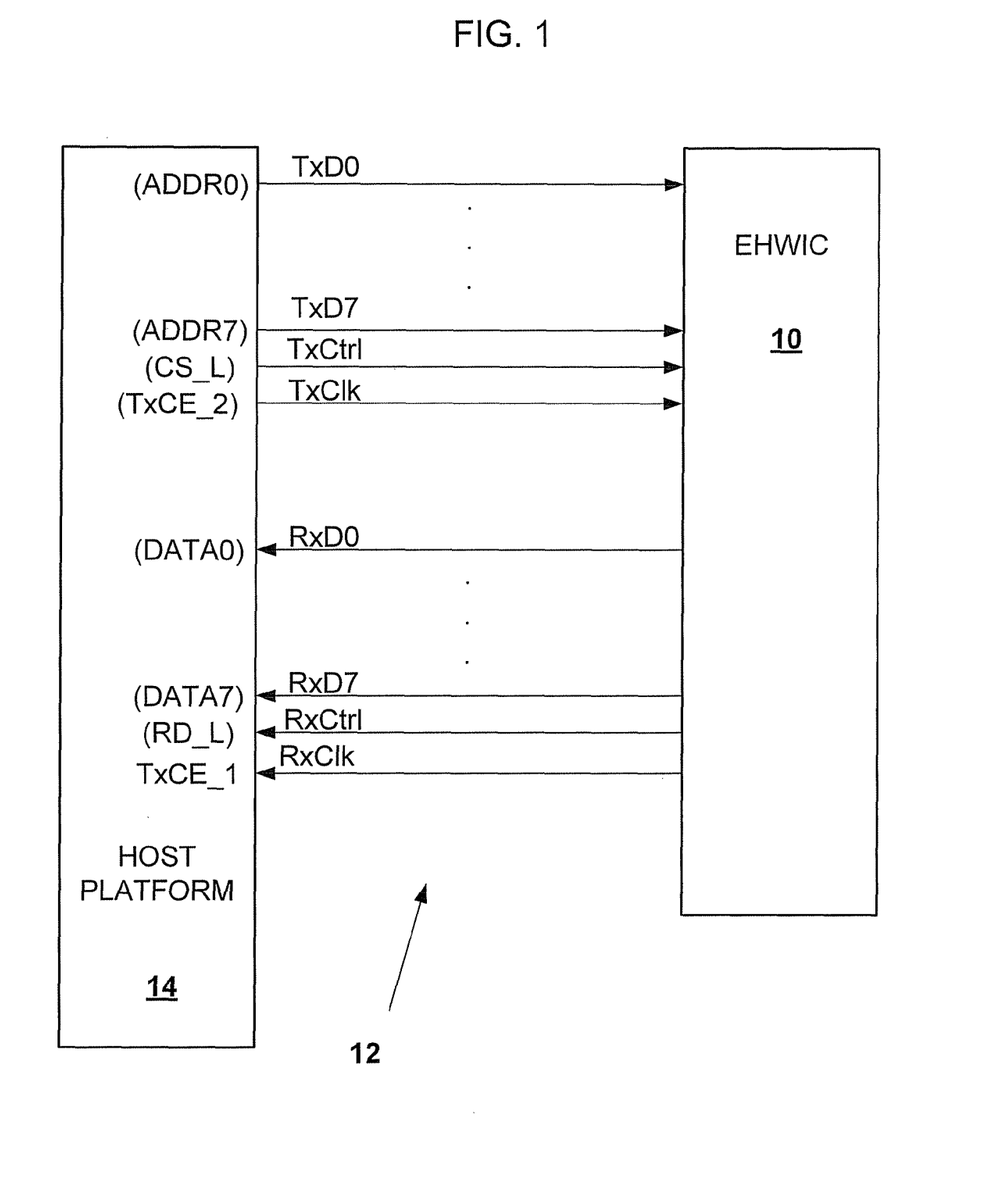
FIG. 1 depicts a block diagram of an example data bus for a host-daughtercard configuration.

In one example shown in FIG. 1, a daughtercard 10 may be connected to a host platform 14. The example shown in FIG. 1 may be used in a routing platform, which may include any component such a router, bridge, switch, layer 2 or layer 3 switch, gateway, etc., that refers to components utilized to implement connectivity within a network or between networks.

The daughtercard 10 may be a plug-in module that provides a wide area network (WAN) interface to any routers or routing devices that may be interconnected to the daughtercard 10. FIG. 1 shows a block diagram of an example system that includes a daughtercard 10 that may be referred to as an enhanced high-speed wide-area-network interface card (EHWIC) that may support an 8-bit double-data rate (DDR) bi-directional bus 12. The EHWIC 10 may communicate with a host platform 14 via the DDR bus 12. Signals depicted in FIG. 1 are: TxD[7:0]—transmit data bus from host; TxCtrl-transmit control bit from host; TxClk-transmit clock from host; RxD[7:0]: receive data bus to host; RxCtrl-receive control bit to host; and, RxClk: receive clock to host.

In one example the DDR bus 12 is a synchronous bus. The DDR bus 12 may be used to: 1) provide a high-speed data path between the host platform 14 and the EHWIC 10 for WAN data; 2) provide access to the on-board registers; and, 3) to provide a direct memory access (DMA) of the host platform 14 for the EHWIC 10 on-board devices. In one example, TxClk and RxClk may run at 50 MHz. The DDR mode allows data to be captured on every clock edge. In one example, the DDR mode provides aggregate bandwidth of approximately 800 Mbps (400 Mbps in each direction).

In one example, address pins ADDR[7:0] of a legacy Host/WIC parallel interface may be appropriated as the TxD[7:0] host to data bus in the DDR bus 12 of the Host/HWIC interface. Also, data pins of a data bus DATA[7:0] of the legacy Host/WIC parallel interface may be appropriated as the RxD [7:0] data bus to host in the DDR bus of the Host/HWIC interface. Additionally, an enable signal CS_L of the legacy interface may be appropriated as the TxCtrl pin of the Host/HWIC interface and a read signal RD_L pin of the legacy Host/WIC interface may be appropriated as the RxCtrl pin of the Host/HWIC interface. Further, legacy Host/WIC parallel interface echo clock pins have been appropriated as the TxClk and RxClk pins in the DDR bus 12 of the Host/HWIC interface.

In one example, an EHWIC interface may be plug compatible with a legacy WIC/Host interface. However, the functionality of some of the pins may differ in this implementation. In the presently-described example, the parallel port pins and the "Echo Clock" (TxCE) pins of the legacy Host/WIC parallel interface may be cannibalized for the EHWIC high-speed bus, the DDR bus 12. This provides for backwards compatibility by still leaving serial peripheral bus (SPI) lines (e.g., SPI bus 30 in FIG. 3), serial communication controllers (SCC's) capable of handling multiple protocols such as high-level data link control (HDLC), universal asynchronous receiver/transmitter (UART), asynchronous HDLC, transparent mode, or binary synchronous communication (BiSYNC), for example, and interrupt lines, etc. available for conventional uses in the legacy Host/WIC parallel interface.

Figure 2:
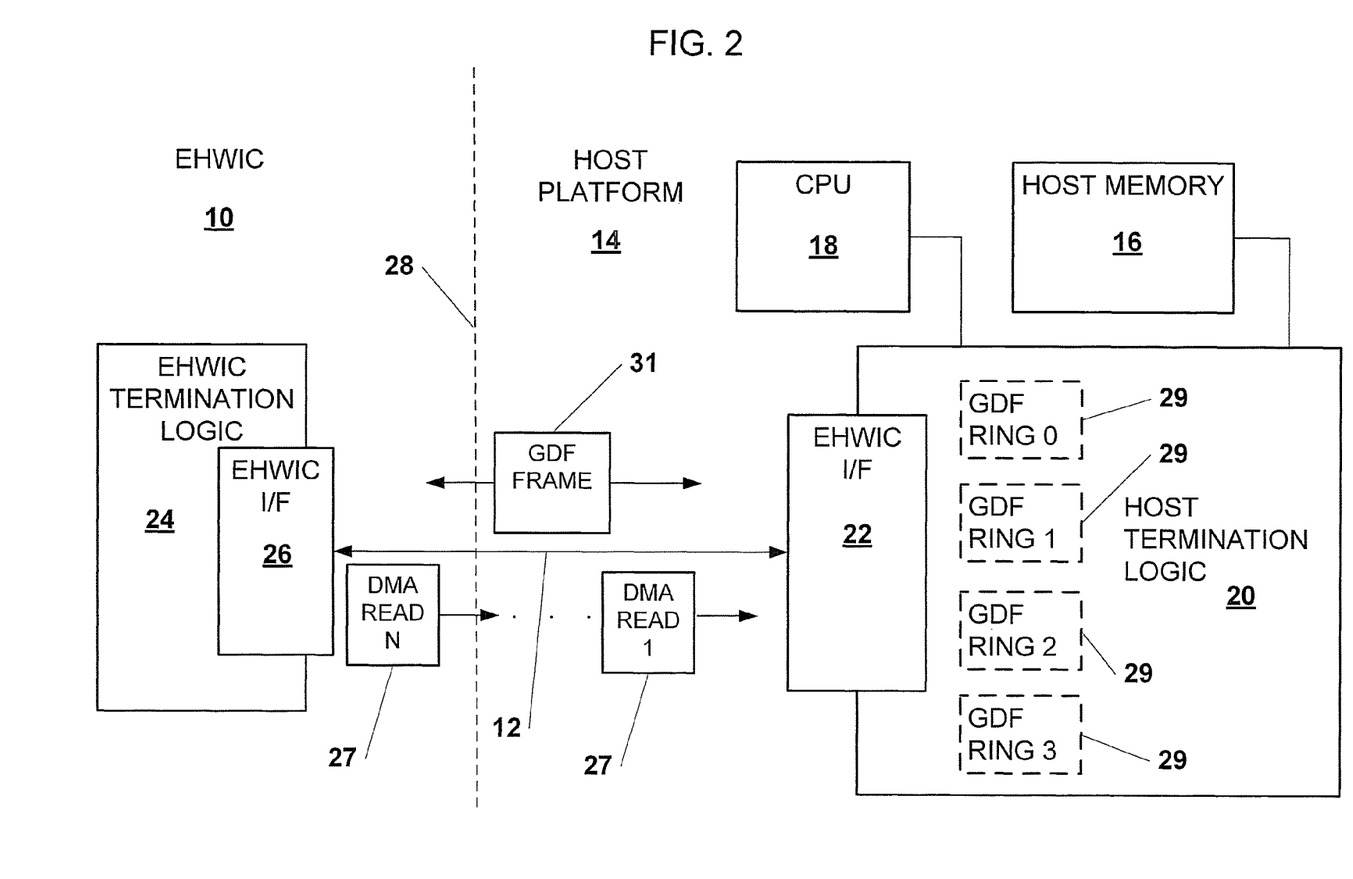
FIG. 2 depicts a block diagram of an example host-daughtercard system.

FIG. 2 is a block diagram of a host-EHWIC system. In FIG. 2 the host platform 14 includes host memory 16 and a central processing unit (CPU) 18 coupled to a host termination logic block 20 including an EHWIC interface 22. The host termination logic 20 may include logic (for example in the form of an field programmable gate array (FPGA) or an application-specific integrated circuit (ASIC)) which resides on the host platform 14 and serves as an interface between the HWIC DDR bus 12 and the rest of the devices on the motherboard.

The EHWIC 10 may include an EHWIC termination logic block 24 including an EHWIC interface 26. The EHWIC termination logic 24 may include logic (for example in the form of an FPGA or ASIC), which resides on the EHWIC 10 and serves as an interface between the DDR bus 12 and other devices on the motherboard. The EHWIC interface 26 may be coupled to a 68-pin connector 28, which may be pin compatible with a legacy EHWIC connector (not shown).

Figure 3:
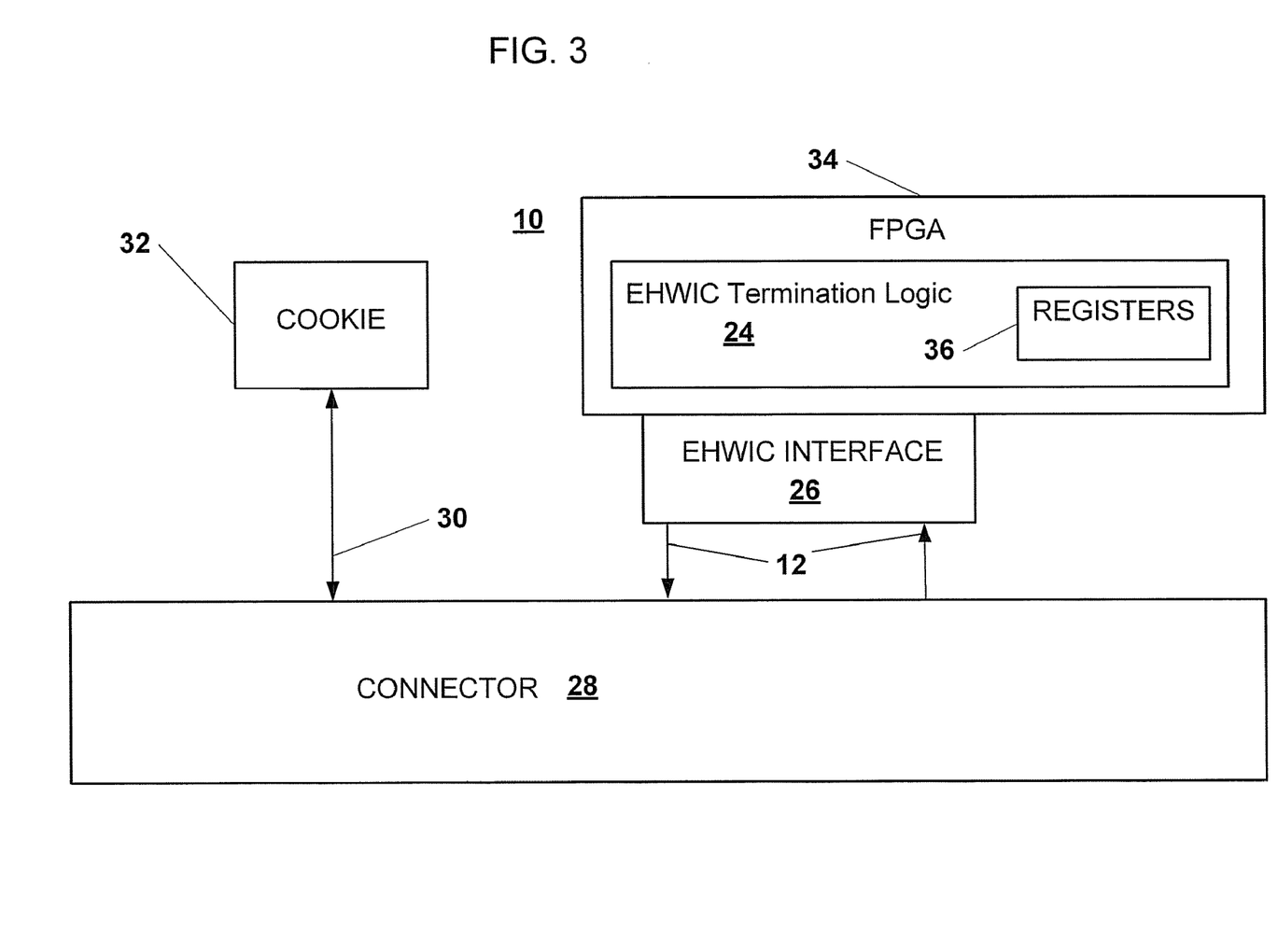
FIG. 3 depicts a block diagram of an example daughtercard configuration.

FIG. 3 is a block diagram of the example EHWIC interface 26 coupled to the connector 28. The EHWIC 10 side may include a SPI bus 30 connected to a cookie 32, which in one example may be a non-volatile memory, such as a non-volatile RAM (NVRAM) in the form of an EEPROM, storing information about a particular implementation. The DDR bus 12 is coupled to the EHWIC termination logic 24 via the EHWIC interface 26, which may include a power pin (not shown) for supplying power to the EHWIC 10. In one example, the EHWIC termination logic 24 resides in a FPGA 34 having a set of configurable registers 36. In one example, the registers 36 may be used to configure the EHWIC 10.

One component of backward compatibility is providing the host platform 14 with a system for determining whether a legacy or upgraded daughtercard has been connected. In one example, this function may be required because, although the parts are pin compatible, certain pins are used to perform completely different functions. In one example, an EHWIC 10 may be plugged into an older host platform, which, in one example, may be the host platform 14, where the old host platform 14 may still access the cookie 32 on the EHWIC 10 via the SPI lines 30 and determine that an inserted WIC, such as the EHWIC 10, is not supported. The EHWIC 10 may be required to not drive the Rx lines of the DDR bus 12 until "enabled", so that the WIC parallel port bus pins will not cause bus contention in the event that an EHWIC 10 is inserted into an older host platform 14. Also, the legacy SCC's may still be available on an EHWIC 10 and can be used for purposes such as management channels.

Two types of frames may be used for communication between the EHWIC 10 and the host platform 14 via the DDR bus 12: control frames and data frames. Data frames may used to pass the larger packets of data between the host platform 14 and the EHWIC 10, en route to and from the line interface. The control frames may be smaller in nature, and perform administrative functions, which may pre-empt the data frames in order to reduce latency. In one example, the control frame formats may be generated and received in hardware, whereas the data frame formats may be determined by the host CPU 18 (with the exception of direct memory access (DMA) frames noted below).

The control bits (RxCtrl, TxCtrl) may distinguish data frames from control frames: TxCtrl, RxCtrl="0": indicates that streaming data is being passed, TxCtrl, RxCtrl="1": indicates that control information is being passed. In one example, the Tx and Rx buses may continuously be transmitting bytes, such as control bytes, data bytes, or idle bytes.

In one example the EHWIC 10 and the host platform 14 may communicate with one another through a frame-based protocol. The frame-based protocol may implement at least two types of data frames, such as DMA data frames and generic data frames (GDFs). In one example, both DMA data frames and GDFs may be transmitted if and only if the respective control bit (TxCtrl or RxCtrl) is "0"; all data frames may carry a CRC8 as the last byte; and the DMA data frames and GDFs may start with an encapsulation header. The GDFs may begin with the 0x12 byte. The DMA data frames may begin with the 0x61, 0x62, 0x66, or 0x67.

In one example, a DMA data frame may serve as a vehicle for EHWIC-initiated DMA transactions. The DMA data frame may allow the EHWIC 10 to read and write to host memory. DMA data frames may be processed entirely in hardware, so it is not necessary for a host processor, such as the host CPU 18, to be involved in these transactions. For example, simple register accesses may be inefficient for reading blocks of registers so DMA frames are utilized to transfer blocks or register data from the EHWIC 10 to the host 14 over the DDR bus 12. The EHWIC 10 requires data structures set up in host processor memory to support its GDF transmit and receive operations. All of these data structures are shared by the host CPU 18 and the host termination logic 20 through DMA accesses.

The GDFs may be an implementation-specific frame agreed upon between host driver software and the EHWIC termination logic 24. For example, a data frame may be an internet protocol (IP) packet or asynchronous transfer mode (ATM) cell that the EHWIC termination logic 24 sends to or receives from a physical layer interface device for data transfer device on the EHWIC 10, for example. In another example, there may be an encapsulation, such as a header with an 8-bit port number indicating which physical layer interface device the EHWIC termination logic 24 sends/receives the packet from. One purpose of the GDF may be to allow flexibility to create whatever frame format will best suit a specific EHWIC being designed.

The DMA frames and GDFs may each be processed in a different manner. The DMA data frames may originate in hardware (on the EHWIC 10 if it is a DMA request, or on the host if it is a DMA response). Upon receipt they are also processed entirely in hardware, leaving the host CPU completely uninvolved in the transaction (until perhaps the very end, after the transaction is completed, when the host is notified via interrupt that a DMA transaction has occurred). FIG. 2 shows an example, in which the EHWIC 10 is configured to generate a plurality of DMA read requests 27 individually designated as DMA read 1 through N. DMA read throughput may be modeled by the following equation:

$$DMA \text{ Read Throughput} = \frac{DMA \text{ Transaction Size} \cdot DMA \text{ Outstanding Reads}}{DMA \text{ Transaction Latency}} \quad \text{EQN. 1}$$

In one example, the plurality of DMA outstanding DMA read requests 27 may be up to 8 (e.g., N may be 8 in FIG. 2), which may result in up to 8 times the DMA read throughput. Thus, once a DMA read request frame is issued, the EHWIC 10 allows additional DMA read requests 27 to be issued while other DMA read response(s) are still pending in the host platform 14. At any point in time, an EHWIC 10 may be allowed a maximum of 8 pending EHWIC DMA read responses.

DMA Outstanding Reads of Eqn. 1 may be the number of outstanding reads that the EHWIC 10 has issued at any point in time. If a host system returns read responses faster than an EHWIC 10 can issue DMA read requests 27, the EHWIC 10 will only have (at most) one outstanding read at any point in time, therefore no DMA Read Throughput increase will be afforded. Likewise if the EHWIC 10 is only fast enough to sustain a couple of outstanding reads, the DMA Read Throughput will only be increased by that proportional amount (×2).

EHWIC DMA read responses by the host platform 14 may be required to be returned in the order that the DMA read requests 27 are issued. If any DMA reads requests 27 are re-ordered outside of the EHWIC host termination logic 24 (e.g., in a system controller), the DMA read requests 27 must be returned to the original (request) order before the read responses are sent over the DDR bus 12.

A DMA write frame (not shown) followed by a DMA read request 27 may occur in a serial fashion due to the nature of the DMA Write Frame (as previously noted). However, the host termination logic 20 may permit a DMA write frame to immediately follow a DMA read request 27, even before a DMA read-response frame (not shown) has been sent. The DMA read requests 27 may be interleaved with DMA write frames in any manner and regardless of the arrival of read response frames as long as the maximum number of outstanding DMA read requests 27 is not exceeded. This may allow DMA operations to more fully utilize the DDR bus 12 by offering maximum flexibility in the movement of DMA data across the DDR bus 12 in both directions.

Figure 4:
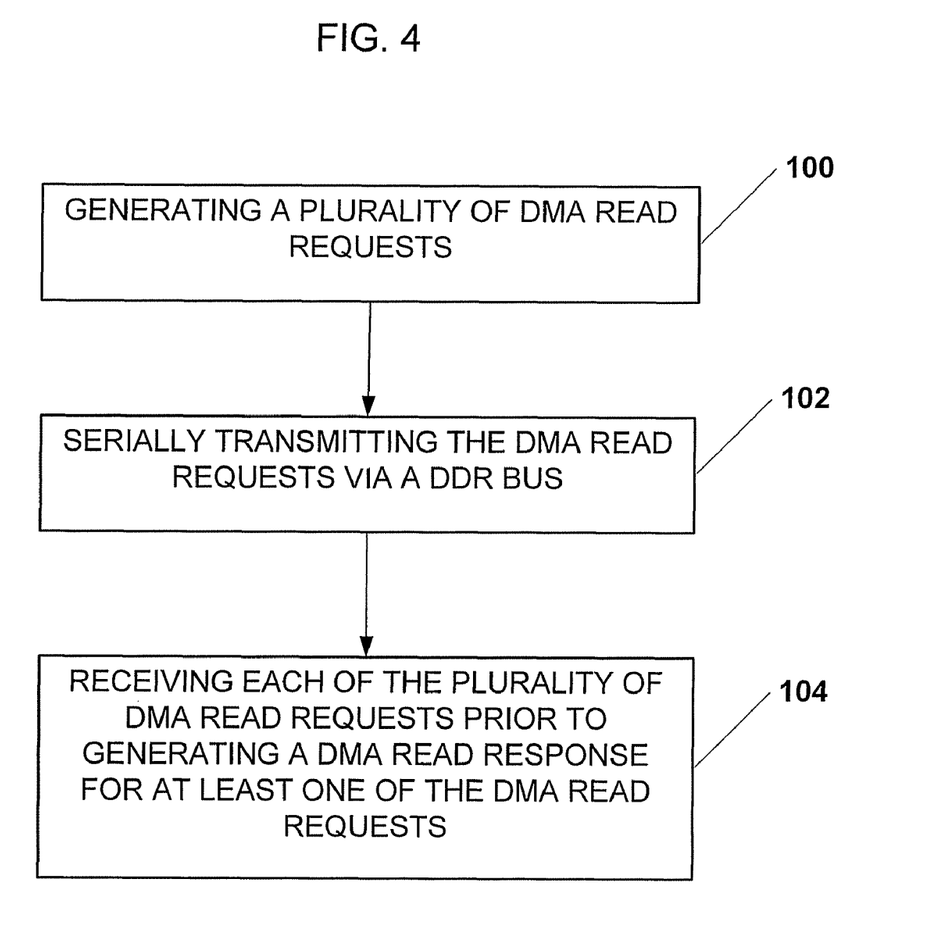
FIG. 4 depicts a flow diagram of an example operation of performing direct memory access transactions.

FIG. 4 shows a flowchart depicting an example operation of performing DMA transactions via a DDR bus. The operation may include an act 100 of generating a plurality of DMA read requests. In one example, act 100 may be performed with a configuration such as that shown in FIG. 2. The EHWIC 10 may generate a plurality of DMA read requests 27. The operation may also include an act 102 of serially transmitting the DMA read requests via a DDR bus. In the example of FIG. 2, act 102 may be performed by the EHWIC 10 by transmitting the DMA read requests 27 via the DDR bus 12 to the host platform 14.

The operation may further include an act 104 of receiving each of the plurality of DMA read requests prior to generating a DMA read response for at least one of the DMA read requests. In the example of FIG. 2, act 104 may be performed by the host platform 14 receiving each of the plurality of DMA read requests 27 prior to a DMA read responses being generated by the host platform 14. In one example, the host platform 14 may have up to 8 outstanding DMA read requests 27 prior to generating a DMA read response.

GDFs may be processed substantially in software on the host side. Any special encapsulations for transmit frames (outside of the initial 0x12 byte) must be created by the host processor. And likewise, received frames are also entirely processed by the host processor (after the leading 0x12 byte and trailing CRC8 byte is removed (see FIG. 6)).

On the EHWIC side, GDFs may be processed in hardware (unless a processor resides on the EHWIC 10), which has carnal knowledge of the EHWIC-specific GDF, that has been agreed upon between the host CPU 18 and hardware of the EHWIC 10. The flexibility of the types of data frames is different. Since the DMA data frame is processed entirely in hardware, it is not flexible and may remain exactly the same format from EHWIC to EHWIC.

Since the GDF is created and parsed by the host CPU 18, the format of the GDF is extremely flexible. It is intended that the host CPU 18 will choose GDF that will facilitate design of each particular EHWIC 10.

In one example, the EHWIC 10 may be configured to operate with a plurality of GDF rings 29 in the host platform 14 as shown in FIG. 2. The plurality of GDF rings 29 may allow proper prioritization of different classes of service, e.g., voice, video, management, and data. The GDF rings 29 exist in both receive and transmit directions, and the GDFs 31 may include additional per-queue DDR bus flow control features. In FIG. 2, the host platform 14 is shown as including the plurality of GDF rings 29 individually denoted as GDF rings 0 through 3, which may each be considered a dedicated GDF queue.

Figure 5:
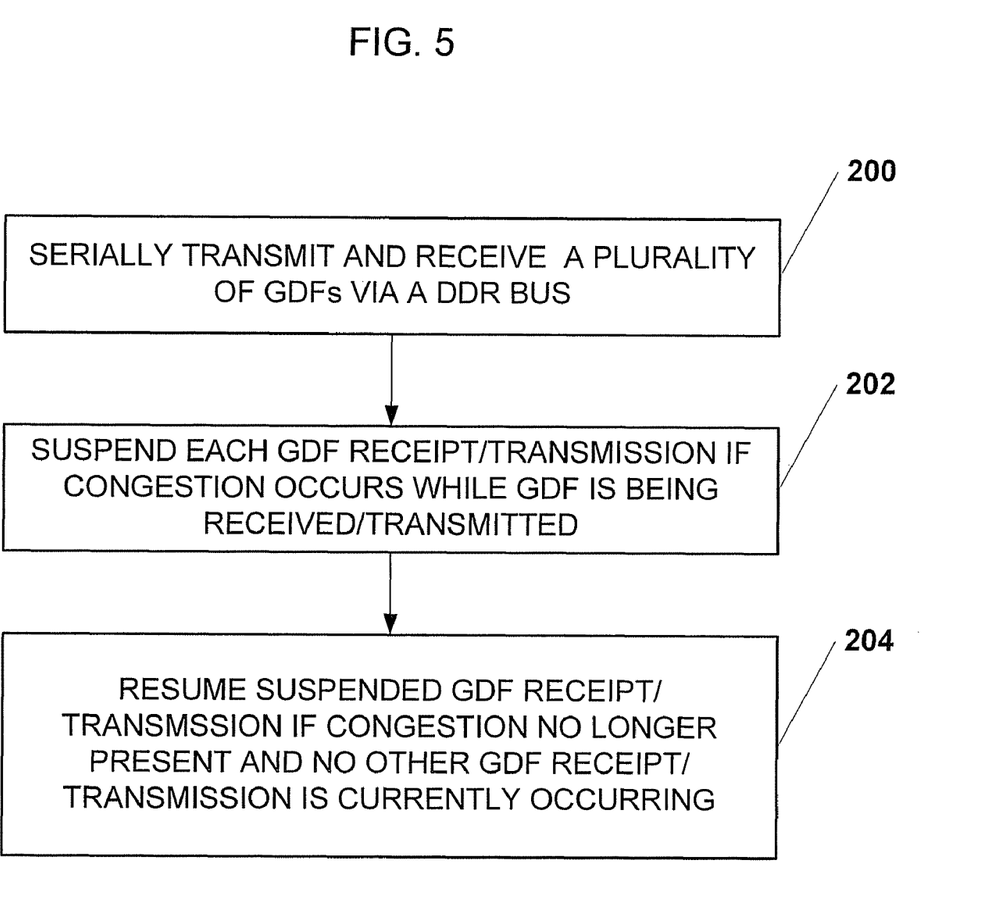
FIG. 5 depicts a flow diagram of an example operation of utilizing a plurality of generic data frame queues.

FIG. 5 shows a flowchart depicting an operation of utilizing a plurality of GDF queues generated in a host platform. In the example configuration shown in FIG. 2, GDFs may be passed via the DDR bus 18 allowing the GDF rings 29, or queues, or transmit or receive GDFs. An act 200 may include serially receiving or transmitting each of a plurality of GDFs via a DDR bus. In one example, act 200 may be performed using a configuration shown in FIG. 2 in which GDFs 31 may be transmitted and received by the host platform 14. The host platform 14 may include a plurality of GDF rings 29 in the host termination logic 20. Each GDF ring 0 through 3 may receive and transmit a GDF via the DDR bus 12.

The operation may further include an act 202 of suspending each GDF receipt or transmission if congestion is occurring during the respective receipt or transmission. For example, in FIG. 2, a GDF 31 may be received by the GDF ring 0. This receipt may become congested if the GDF ring 0 is becoming full. This receipt may be suspended, allowing another GDF ring 29, such as GDF ring 1 through 3, to receive GDFs, while experience uncongested conditions. The suspension may occur through a control byte being transmitted from the host platform 14 to the EHWIC 10. The suspension may occur accordingly for the other GDF rings 29. Similarly, this may occur in the transmit direction. For example, a GDF 31 may be transmitted by a GDF ring 29. Transmission may need to be suspended if network congestion is occurring. The host platform 14 may be made aware through a control byte transmitted by the EHWIC 10 via the DDR bus 12.

The operation may further include an act 204 of resuming each suspended GDF receipt or transmission if a suspended GDF receipt/transmission is no longer congested and no other GDF receipt or transmission is currently occurring. For example, in FIG. 2 if a GDF 31 receipt or transmission is currently suspended in any of the GDF rings 0 through 3, a receipt or transmission, respectively, may be resumed for each suspended GDF ring 0 through 3 if the suspended GDF ring 0 through 3 is no longer congested, or full, and no other GDF ring 29 is currently receiving or transmitting a GDF. In another example, the GDF rings 29 may be prioritized with respect to one another allowing certain GDF rings 29 to have resume priority over the other GDF rings 29.

Figure 6:
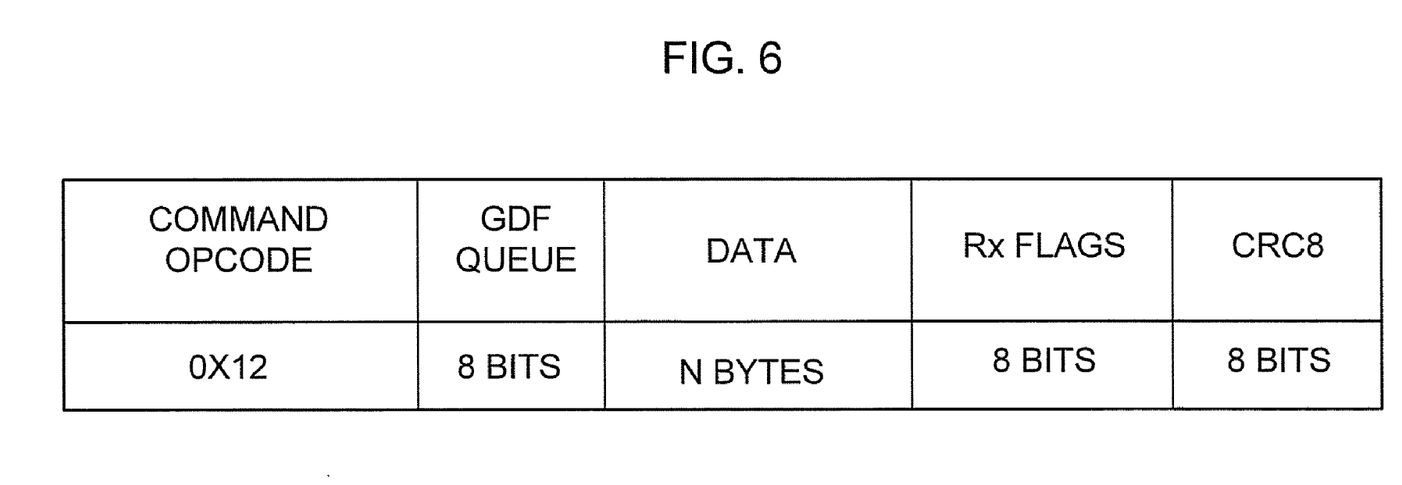
FIG. 6 depicts an example of a bus protocol used to transmit and receive data from a plurality of generic data frame queues.

FIG. 6 shows an EHWIC GDF. The following are bus codes that may be used with regard to the GDF rings (queues) 29:

Command Opcode 0x12: GDFs passed between the EHWIC 10 and the host 14 may begin with a 0x12 byte in order to indicate GDF encapsulation. The 0x12 Command Opcode may be followed by a GDF queue byte.

GDF Queue: The GDF queue field indicates which GDF queue a corresponding data frame belongs to, and whether or not the corresponding data frame is a continuation, which may be a resumption of a GDF frame previously suspended, such as through a suspend transmit request for GDF queue control byte. The byte encodings are as follows:

Bit 7: Frame Resume Indicator: Indicates whether a GDF frame is a continuation.

0x0—This is the beginning of a new GDF frame (not previously suspended by a "Suspend Transmit Request for GDF Queue" control byte, followed by 0xF5 "Frame Suspend Indicator").

0x1—This GDF frame is a continuation (frame previously suspended by a "Suspend Transmit Request for GDF Queue" control byte, followed by 0xF5 "Frame Suspend Indicator").

The Frame Resume Indicator bit may only be used for error detection; e.g. if the host termination logic 20 receives a continuation frame when new frame is expected, this will be reported as an error event.

Bits 6-2: Unused—Set to zeroes.

Bits 1-0: GDF Queue: Indicates the GDF ring 29 that the corresponding frame belongs to: 0x0—GDF ring 0; 0x1—GDF ring 1; 0x2—GDF ring 2; and 0x3—GDF ring 3.

Data: The "Data" field may be any data of any non-zero length (providing of course that it follows the implementation-specific format agreed upon by host driver software and the EHWIC termination logic 24). For example, this could be an IP packet, ATM cell, or PPP frame, encapsulated with a port number or VC number in the header.

Rx Flags: For GDFs passed from the EHWIC 10 to the host platform 14, the upper 2 bits of the Rx Flags byte may be written to a receive buffer descriptor word 1 bits 23-22. This may allow the passing of error/status information that may not be readily available for insertion into the beginning of the GDF, for example line CRC calculations that are not completed until the end of the frame arriving at the a physical layer interface device for data transfer device on the EHWIC 10 that do not store the entire frame before passing it up to the host.

The Rx Flags byte is also placed into the receive buffer and counted in the data length field of the receive buffer descriptor, so if the Rx Flags functionality is not needed this byte may be used for frame data as long as the host processor ignores the Rx Flags in the Receive Buffer Descriptor (word 1 bits 23-22).

Cyclic redundancy check 8 (CRC8): 8-bit mathematical manner in which to calculate data for corruption, which may be performed on all frame bytes except the CRC8 field itself. Additionally, the CRC8 may not be calculated over any inserted control frames.

Control frames may have three principal functions: 1) flow control by means of stop, resume, and transmit control characters, 2) read/write commands utilized to perform the functions of the legacy parallel port, and, 3) interrupt frames. A control frame (or byte) may be transmitted if and only if the respective control bit (TxCtrl or RxCtrl is "1"). A data frame may be transmitted if and only if the respective control bit (TxCtrl or RxCtrl) is "0".

The control frames for implementing the suspend transmit requests and resuming transmit requests for the GDF rings 0 through 3 are below:

0xA0—Suspend Transmit Request for GDF Ring 0: This control character may be sent either by the host platform 14 or by the EHWIC 10, to request that the other party suspend transmitting data frames for GDF ring 0. This is intended for flow control purposes, to prevent the overflow of a first in first out (FIFO) or the GDF ring 0 that is becoming full. Upon receiving a "suspend transmit" request, a transmitting party may send a maximum of 128 more GDF bytes from GDF ring 0 before ceasing transmission of all GDF bytes from the GDF ring 0. After this, the transmitting party may continue transmitting other types of data frames. If the transmitting party is not currently transmitting a GDF from GDF ring 0, it may continue transmitting other types of data frames without interruption. However, it may only transmit up to 128 more bytes from the GDF ring 0 until such time as it receives a resume byte.

0xA3—Resume Transmit Request for GDF Ring 0: This control character may be sent either by the host platform 14 or by the EHWIC 10, to request that the other party resume data frame transmission for GDF ring 0, after transmission has been suspended by the "Suspend Transmit Request for GDF Ring 0" control byte.

0xA5—Suspend Transmit Request for GDF Ring 1: This control character may be sent either by the host platform 14 or by the EHWIC 10, to request that the other party suspend transmitting data frames for GDF ring 1. This is intended for flow control purposes, to prevent the overflow of a FIFO or GDF ring 1 becoming full. Upon receiving a "suspend transmit" request, the transmitting party may send a maximum of 128 more GDF bytes from the GDF ring 1 before ceasing transmission of all GDF bytes from the GDF ring 1. After this, the transmitting party may continue transmitting other types of data frames. If the transmitting party is not currently transmitting a GDF from GDF ring 1, it may continue transmitting other types of data frames without interruption. However, it may only transmit up to 128 more bytes from the GDF ring 1 until such time as it receives a resume byte.

0xA6—Resume Transmit Request for GDF Ring 1: This control character can be sent either by the host platform 14 or by the EHWIC 10, to request that the other party resume data frame transmission for GDF ring 1, after transmission has been suspended by the "Suspend Transmit Request for GDF Ring 1" control byte.

0xA9—Suspend Transmit Request for GDF Ring 2: This control character can be sent either by the host platform 14 or by the EHWIC 10, to request that the other party suspend transmitting data frames for GDF ring 2. This is intended for flow control purposes, to prevent the overflow of a FIFO or GDF ring 2 that is becoming full. Upon receiving a "suspend transmit" request, the transmitting party may send a maximum of 128 more GDF bytes from the GDF ring 2 before ceasing transmission of all GDF bytes from the GDF ring 2. After this, the transmitting party may continue transmitting other types of data frames. If the transmitting party is not currently transmitting a GDF from GDF ring 2, it may continue transmitting other types of data frames without interruption. However, it may only transmit up to 128 more bytes the GDF ring 2 until such time as it receives a resume byte.

0xAA—Resume Transmit Request for GDF Ring 2: This control character can be sent either by the host platform 14 or by the EHWIC 10, to request that the other party resume data frame transmission for the GDF ring 2, after transmission has been suspended by the "Suspend Transmit Request for GDF ring 2" control byte.

0xAC—Suspend Transmit Request for GDF Ring 3: This control character can be sent either by the host platform 14 or by the EHWIC 10, to request that the other party suspend transmitting data frames for the GDF ring 3. This is intended for flow control purposes, to prevent the overflow of a FIFO or the GDF ring 3 that is becoming full. Upon receiving a "suspend transmit" request, the transmitting party may send a maximum of 128 more GDF bytes from the GDF ring 3 before ceasing transmission of all GDF bytes from the GDF ring 3. After this, the transmitting party may continue transmitting other types of data frames. If the transmitting party is not currently transmitting a GDF from the GDF ring 3, it may continue transmitting other types of data frames without interruption. However, it may only transmit up to 128 more bytes from the GDF ring 3 until such time as it receives a resume byte.

0xAF—Resume Transmit Request for GDF Ring 3: This control character can be sent either by the host platform 14 or by the EHWIC 10, to request that the other party resume data frame transmission for the GDF ring 3, after transmission has been suspended by the "Suspend Transmit Request for GDF Ring 3" control byte.

0xF5—Frame Suspend Indicator: This control character may be sent either by the host platform or by the EHWIC 10, in response to a GDF Queue Suspend Transmit request, such as that corresponding to control bytes 0xA0, 0xA5, 0xA9, or 0xAC, in order to indicate that a current GDF has been suspended and not completely transmitted. This indicates to a receiving party that it has received only a partial frame and it should act accordingly (for example, wait for the rest of the frame before checking the CRC8 field or forwarding the frame).

The 0xF5 control byte is the end-of-frame indicator for a suspended (partial) frame. After the last byte of the suspended (partial) frame is sent, the 0xF5 control byte should appear before any subsequent an end-of-frame/idle control byte. Once a frame has been suspended with the 0xF5 Frame Suspend Indicator it may be resumed with a Frame Resume Indicator discussed in regard to FIG. 6.

The 0xF5 Frame Suspend Indicator may not be sent between the 0x12 EHWIC GDF opcode and the EHWIC Generic Data Frame Queue Byte (see FIG. 6). This is because before the queue byte is sent, the receiving logic cannot determine which queue to suspend. Frame Suspend Indicators sent between the 0x12 EHWIC GDF opcode and the EHWIC GDF Queue Byte should be ignored by the receiving logic, and possibly logged as an error.

The host termination logic 20 may only suspend an in-progress frame (via the 0xF5 control byte) to the EHWIC 10 in response to receiving a GDF Queue Suspend Transmit request of some type (control bytes 0xA0, 0xA5, 0xA9, or 0xAC) from the EHWIC 10. However, the EHWIC 10 may use 0xF5 to suspend a GDF "spontaneously"; that is, without having prior received a GDF Queue Suspend Transmit Request from the host. Regardless of whether the EHWIC module chooses to use spontaneous suspend, it may suspend a GDF queue in response to a GDF Queue Suspend Transmit request received from the host termination logic 20, and remain suspended until it receives the respective GDF Queue Resume Transmit Request.

The host termination logic 20 is not allowed to spontaneously suspend GDF's, in part because this should never be necessary because the host termination logic 20 controls the order in which data arrives from the host controller (via DMA), and in part in order to keep the EHWIC 10 logic unburdened from receiving spontaneously suspended GDF's.

The memory 16 and termination logic 20, 24 is additionally or alternatively a computer readable storage medium with processing instructions. Data representing instructions executable by the programmed CPU 18 and termination logic 20, 24 provided for operating a host platform-daughtercard configuration. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

In one example, the operations of FIGS. 4 and 5 may be performed through logic encoded on at least one memory and executed on at least one of the associated processors as described in regard to FIGS. 1-3. The logic in each memory is appropriate for the associate processor. Logic encoded in one or more tangible media for execution is defined as the instructions that are executable by a programmed processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A bus system comprising:
a host-network interface card configuration wherein a host is configured to recognize a network interface card to establish a double data rate bus between the host and the network interface card;
wherein the host is configured to generate a plurality of generic data frame queues, wherein each of the generic data frame queues is configured to receive and to transmit generic data frames via the double data rate bus,
wherein reception and transmission of the generic data frames by each of the plurality of generic data frame queues may be prioritized with respect to one another based on a predetermined condition;
wherein the host is configured to:
determine the predetermined condition; and
send a control signal for receipt by the network interface card to suspend transmission of the generic data frames to a first generic data frame queue of the plurality of generic data frame queues and to determine whether to send the generic data frames to a second generic data frame queue of the plurality of generic data frame queues, the control signal being sent based on the determination of the predetermined condition;
wherein the host is configured to receive the generic data frames in a second one of the plurality of generic data frame queues after sending the control signal; and
wherein the network interface card is configured to:
receive the control signal; and
transmit only a part of a first generic data frame of the generic data frames to the first generic data frame queue before reception of the control signal.

2. The bus system of claim 1, wherein each of the plurality of generic data frame queues is associated with a respective predetermined condition, and wherein each of the plurality of generic data frame queues is configured to be suspended from receiving a generic data frame via the double data rate bus based on the respective predetermined condition.

3. The bus system of claim 1, wherein the first control signal sent to the network interface card via the double data rate bus occupies no more than a single transmit clock cycle from a host period, and wherein the first control signal preempts any generic data frame traffic on the double data rate bus.

4. The bus system of claim 1, wherein the predetermined condition is the first generic data frame queue of the plurality of generic data frame queues being full.

5. The bus system of claim 1, wherein the host is configured to transmit a second control signal via the double data rate bus to the network interface card to resume receipt of the first generic data frame by the first one of the plurality of generic data frame queues.

6. The bus system of claim 1, wherein each of the plurality of generic data frame queues is associated with a respective predetermined condition, and wherein each of the plurality of generic data frame queues is configured to be suspended from transmitting a generic data frame via the double data rate bus based on the respective predetermined condition.

7. The bus system of claim 6, wherein the network interface card is configured to send a first control signal via the double data rate bus to the host to suspend transmission of a first generic data frame by a first one of the plurality of generic data frame queues based on the respective predetermined condition.

8. The bus system of claim 7, wherein the first control signal sent to the host via the double data rate bus occupies no more than a single receive clock cycle from a network interface card period, and wherein the first control signal preempts any generic data frame traffic on the double data rate bus.

9. The bus system of claim 7, wherein the respective predetermined condition is congestion of a network port receiving the first generic data frame.

10. The bus system of claim 7, wherein one of the plurality of generic data frame queues other than the first generic data frame queue is configured to transmit a second generic data frame upon suspension of the transmission of the first generic data frame by the first one of the plurality of generic data frame queues.

11. The bus system of claim 7, wherein the network interface card is configured to transmit a second control signal via the double data rate bus to the host to resume transmission of the first generic data frame by the first one of the plurality of generic data frame queues.

12. A method comprising:
passing a first generic data frame via a double data rate bus, the first generic data frame corresponding to a first generic data frame queue;
receiving a control signal to suspend the passing of the first generic data frame based on a determination of a predetermined condition;
suspending the passing of the first generic data frame upon receipt of the control signal to suspend the passing of the first generic data frame;
passing a second generic data frame via the double data rate bus upon receipt of the control signal to suspend the passing of the first generic data frame, the second generic data frame corresponding to a second generic data frame queue; and
resuming the passing of the first generic data frame via the double data rate bus upon completion of the passing of the second generic data frame,
wherein passing the first generic data frame via the double data rate bus comprises passing only a part of the first generic data frame before receiving the control signal to suspend the passing of the first generic data frame.

13. The method of claim 12, wherein passing the first generic data frame via the double data rate bus comprises receiving the first generic data frame by the first generic data frame queue via the double data rate bus.

14. The method of claim 13, wherein passing the second generic data frame via the double data rate bus comprises receiving the second generic data frame by the second generic data frame queue via the double data rate bus upon suspension of receipt of the first generic data frame.

15. The method of claim 12, wherein passing the first generic data frame via the double data rate bus comprises transmitting the first generic data frame from the first generic data frame queue via the double data rate bus.

16. The method of claim 15, wherein passing the second generic data frame via the double data rate bus comprises transmitting the second generic data frame from the second generic data frame queue via the double data rate bus upon suspension of transmission of the first generic data frame.

17. The method of claim 12, wherein the control signal occupies no more than a single clock period, and wherein transmission of the control signal preempts any generic data frame traffic on the double data rate bus.

18. A non-transitory computer-readable medium encoded with computer executable instructions, the computer executable instructions executable with a processor, the non-transitory computer-readable medium comprising:
instructions executable to pass a first generic data frame via a double data rate bus, the first generic data frame corresponding to a first generic data frame queue;

instructions executable to receive a control signal to suspend the passing of the first generic data frame based on a determination of a predetermined condition;

instructions executable to suspend the passing of the first generic data frame based on receipt of the control signal to suspend the passing of the first generic data frame;

instructions executable to pass a second generic data frame via the double data rate bus upon receipt of the control signal to suspend the passing of the first generic data frame, the second generic data frame corresponding to a second generic data frame queue; and instructions executable to resume passing the first generic data frame via the double data rate bus upon completion of the passing of the second generic data frame, wherein the instructions executable to pass the first generic data frame via the double data rate bus comprises instructions executable to pass only a part of the first generic data frame before receiving the control signal to suspend the passing of the first generic data frame.

19. The non-transitory computer-readable medium of claim 18, further comprising instructions executable to suspend the passing of the second generic data frame prior to completion of passing the second generic data frame based on a second condition; and instructions executable to pass a third generic data frame via the double data rate bus, the third generic data frame corresponding to a third generic data frame queue.

20. The non-transitory computer-readable medium of claim 19, further comprising instructions to suspend passing the third generic data frame prior to completion of the transmission of the third generic data frame based on a third condition; and instructions executable to pass a fourth generic data frame via the double data rate bus, the fourth generic data frame corresponding to a fourth generic data frame queue.

21. The non-transitory computer-readable medium of claim 18, further comprising:

instructions executable to transmit a plurality of dynamic memory access read requests to a host from a network interface card via the double data rate bus, and instructions executable to allow the plurality of dynamic memory access read requests to remain pending with the host prior to the host responding to any one of the dynamic memory access read requests.

22. The non-transitory computer-readable medium of claim 21, wherein the control signal occupies no more than a single clock period, and wherein transmission of the control signal preempts any generic data frame or dynamic memory access read request traffic on the double data rate bus.

23. The method of claim 12, further comprising:

receiving only a part of the first data frame upon the determination of the predetermined condition.

* * * * *